United States Patent [19]

Ando et al.

[11] Patent Number: 4,862,439
[45] Date of Patent: Aug. 29, 1989

[54] RECORDING DEVICE THAT IDENTIFIES RECORDABLE AREAS OF A DISK RECORD

[75] Inventors: Ryo Ando, Tokyo; Tadao Yoshida, Kanagawa; Kazuhiko Fujiie, Tokyo; Toshio Yoshida, Saitama, all of

[73] Assignee: Sony Corporation, Tokyo, Japan

[21] Appl. No.: 145,589

[22] Filed: Jan. 19, 1988

[30] Foreign Application Priority Data

| Jan. 19, 1987 | [JP] | Japan | 62-09485 |
| Mar. 3, 1987 | [JP] | Japan | 62-48520 |
| Mar. 10, 1987 | [JP] | Japan | 62-54498 |

[51] Int. Cl.⁴ .............................................. G11B 7/00
[52] U.S. Cl. ...................................... 369/30; 369/32; 369/56; 369/58; 360/72.1
[58] Field of Search ............... 360/8, 27, 72.1, 72.2; 369/30, 32, 56, 58

[56] References Cited

U.S. PATENT DOCUMENTS 4,734,795  3/1988  Fukami et al. ........................... 360/8

FOREIGN PATENT DOCUMENTS 0158067 10/1985 European Pat. Off. .
0189948  8/1986 European Pat. Off. .
0190774  8/1986 European Pat. Off. .
52-20814  2/1977 Japan .

Primary Examiner—Robert L. Richardson
Attorney, Agent, or Firm—Lewis H. Eslinger; Donald S. Dowden

[57] ABSTRACT

A disk recording device records blocks of data such as musical information on a recordable disk where absolute addresses have been previously recorded. Address data indicating the starting and ending address of each block is recorded in a lead-in section, and recordable areas of the program area, such as unrecorded parts or unnecessarily recorded parts, are detected on the basis of the address data of each block. The respective lengths of the recordable areas are indicated. Hence the user can easily identify unrecorded or unnecessarily recordced areas that are long enough for further recording.

15 Claims, 8 Drawing Sheets

RECORDING DEVICE THAT IDENTIFIES RECORDABLE AREAS OF A DISK RECORD

BACKGROUND OF THE INVENTION

1. Field of the Invention

This invention relates to a disk recording device for recording data such as muscial information on a recordable disk on which absolute addresses have been previously recorded. This invention is applied to a plyaing device for recordable and reproducible compact disks or CDs.

2. Description of the Prior Art

Read only memory type disk playing devices such as CD players for exclusively reproducing compact disks or CDs wherein musical or audio signals are digitized and recorded on optical disks have been utilized. In these compact disks, all the musical tones involved are successively recorded, and when reproduction of one tune is over, said CD players usually continue reproducing operation of the next tune so that successive reproduction takes place.

Known CD players are exclusive for reproduction, so it has been evolved to provide a disk system which uses an opto-magnetic disk made of a rewritable opto-magnetic recording medium for enabling information recording and reproduction and which retains superior compatability with the compact disks.

In a recordable disk 1 employed in such disk system, as shown in FIG. 1 of the accompanying drawings, there are formed spiral pre-grooves 2 each of which is $\lambda/8$ in depth ($\lambda$ indicates the wavelength of a laser beam for recording information). In each land section 3 between the pre-grooves 2, a pre-recorded area 4 on which pits of $\lambda/4$ in depth are recorded in the circumferential direction presenting uneven shapes and a data record area 5 where the opto-magnetic recording is performed are alternately provided at regular intervals. Also in the recordable disk 1, there is provided a lead-in section 7 on the inner circumference of a program area 6 where musical information is recorded, and so-called TOC (table of contents) information indicating the recorded contents on the program area6 are recorded in the lead-in section 7. With reference to FIG. 2, one frame of a data format standardized in the compact disks adopting EFM (Eight to Fourteen Modulation) consists of 588 channel bits, with 24-bit synchronous signals, 14-bit (one symbol) subcodes, 14×32-bit (32 symbols) data such as musical information with parity, and 3-bit margin bits provided between the respective symbols. Among these modulation data, above-stated synchronous signals and subcodes are recorded on the pre-recorded area 4 of the recordable disk 1 presenting uneven shapes produced by a so-called embossing finish, and are provided with absolute timing information (absolute address) as the subcode from a starting position on the program area 6.

The disk system utilizing such recordable disk 1 controls for example rotation of the disk at Constant Linear Velocity (CLV) by using the absolute address reproduced from the pre-recorded area 4, and performs information recording and reproduction with the standardized data format for the compact disks.

It is to be noted that all the tunes are not necessarily recorded in succession on the disk in such disk system retaining superior compactability to said compact disks. That is, an unrecorded part may appear between a first tune and a second tune, for example. In such a case, if successive reproduction is performed, a silent part may be continuously reproduced during the interval after the termination of the first tune and before the start of the second tune. Also in case a so-called superposed recording, namely, recording a new tune to an already recorded section, if a part of the originally recorded tune remains after the newly recorded tune, such part is also reproduced during reproduction. Besides, in case further recording is performed in a recordable area including an unrecorded area or unnecessarily recorded area using a disk on which several tunes have already been recorded, it is necessary to determine if such recordable area is spacious or long enough for newly proposed recording. In such a case, a complicated operation for seeking a starting part of the already recorded tune so as to calculate the recorded time is required. When said unrecorded and/or unnecessarily recorded areas are present dispersedly in the plural sections, tremendous steps are required for determining the recordable area needed for recording a new tune.

OBJECTS AND SUMMARY OF THE INVENTION

It is an object of the present invention to provide a disk recording device for recording data such as musical information on a recordable disk where absolute addresses have been previously recorded that can easily confirm a recordable area such as an unrecorded area or unnecesarily recorded area on the recordable disk so as to realize efficient data recording.

It is another object of the present invention to provide a disk recording device that can detect a recordable area on the basis of address data reproduced from a lead-in section by recording the address data in an information block area where data of a program area have already been recorded in the lead-in section provided at an inner or outer circumference of the disk after the recording operation of data in the program area of a recordable disk where absolute addresses have already been recorded is terminated.

It is a still another object of the present invention to provide a disk recording device that detects a recordable area on the basis of address data reproduced from a lead-in section of a recordable disk so as to indicate address difference data indicating said recordable area by a display means.

A further object of the present invention is to provide a disk recording device that previously writes address difference data indicating a recordable area on a storage medium and indicates these data by sequentially reading them out in accordance with operational inputs.

A still further object of the present invention is to provide a disk recording device that detects a recordable area on the basis of address data reproduced from a lead-in section of a recordable disk, and indicates address difference data indicating the recordable area thereof by a display means so as to perform data recording in respect to the recordable area where the address difference data are indicated by said indicating means.

Other features and advantages of the invention will be apparent in the following description, the appended claims and the accompanying drawings.

DESCRIPTION OF A PREFERRED EMBODIMENT

Figure 1:
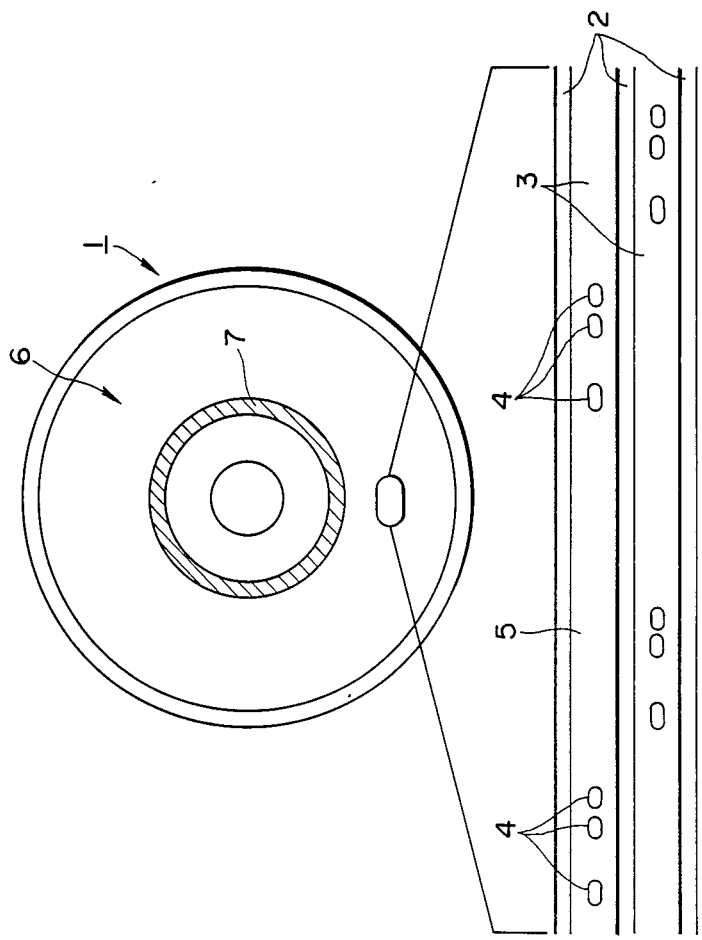
FIG. 1 is a schematic view of a record format of a recordable disk employed for a disk recording device of the present invention.
Figure 2:
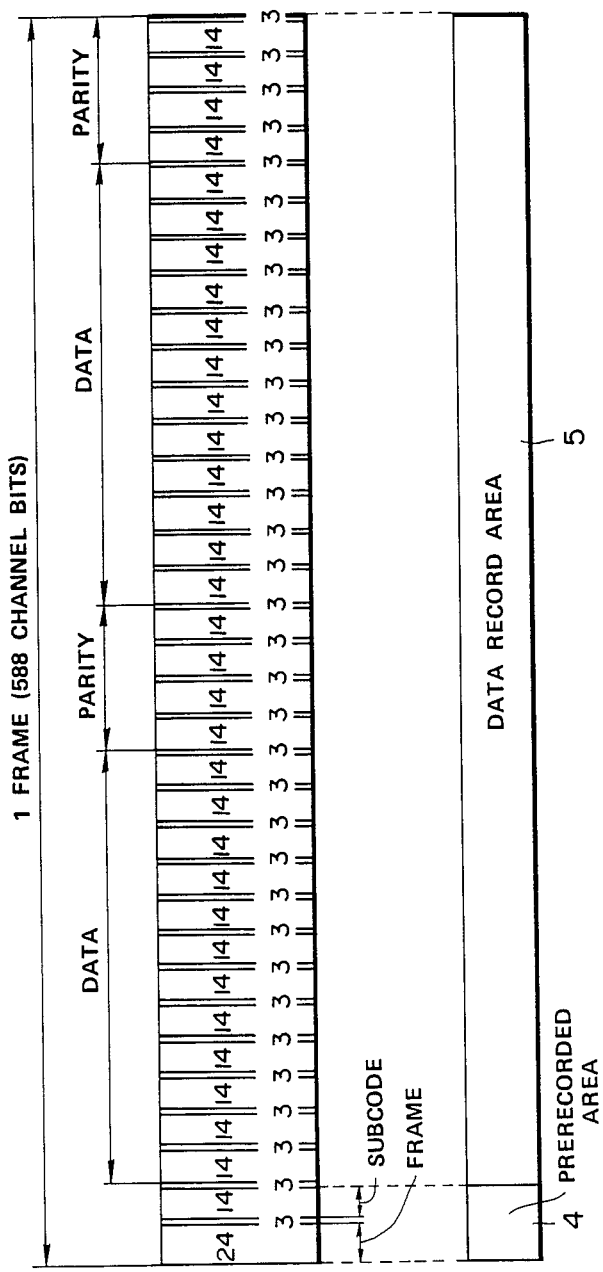
FIG. 2 is a schematic view of a data format of information to be recorded on the recordable disk.

As seen from an embodiment illustrated in FIGS. 3 to 9, the present invention is applied to a disk recording/reproducing device for recording and reproducing musical information having a data format in conformity with a CD standard as shown in FIG. 2, using an optomagnetic disk wherein a vertical magnetizing membrance with a magneto-optical effect serves as a record medium as a recordable disk 1 for recording a record format of FIG. 1 thereon. In this device, data recording/reproduction is performed at an optical head 12 while said recordable disk 1 rotates at Constant Linear Velocity (CLV).

Figure 3:
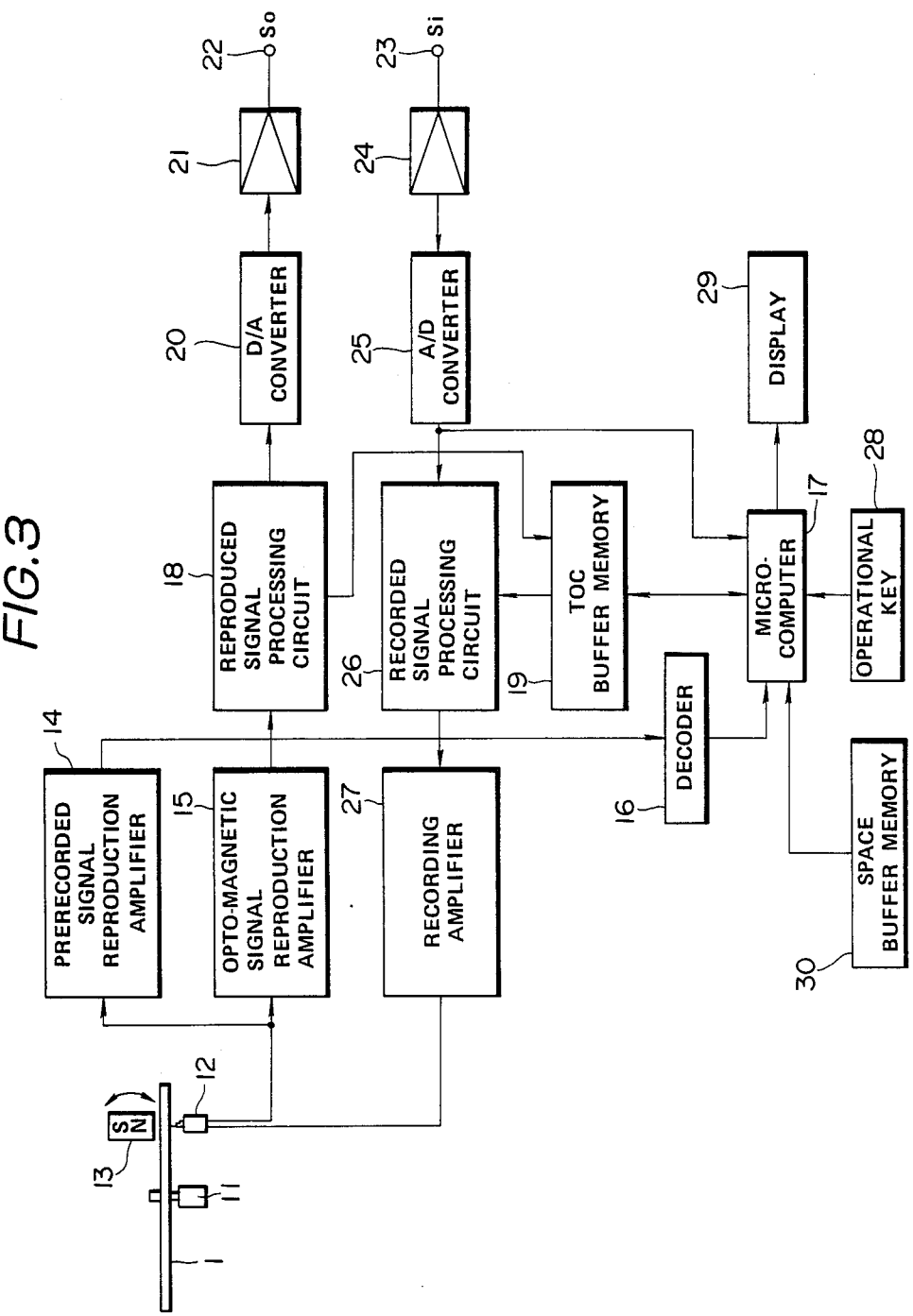
FIG. 3 is a block diagram illustrating an outlined structure of a disk recording/reproducing device to which the present invention is applied.
Figure 4:
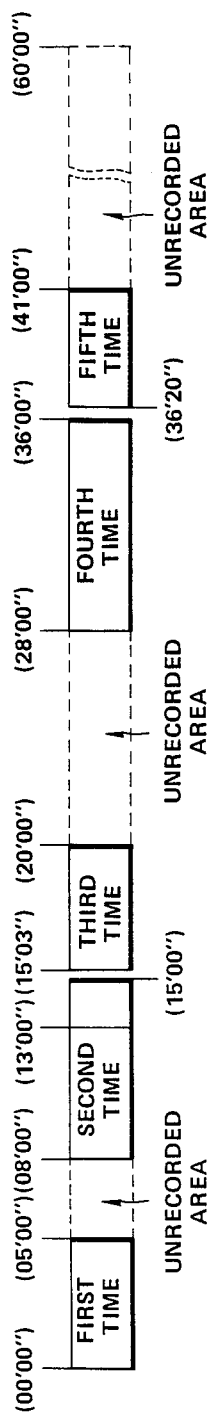
FIG. 4 is a schematic view showing the recorded contents of a program area of a recordable disk employed with the disk recording/reproducing device of FIG. 3.

As seen from a block diagram of FIG. 3, the disk recording/reproducing device of the present embodiment has the optical head 12 and a magnet 13 oppositely mounted with the recordable disk 1 which is rotated by a disk motor 11 being placed between them. The optical head 12 is connected to a prerecorded signal reproduction amplifier 14, an opto-magnetic signal reproduction amplifier 15, and a recording amplifier 27.

The optical head 12 consists of several optical parts such as a laser diode, a photodetector, a lens and a beam splitter and performs information recording and reproduction by irradiating a laser beam to the recordable disk 1. The magnet 13 applies the recordable disk 1 with a magnetic field for information recording or erasure using the magneto-optical effect, and is controlled such that its polarity reverses at the recording mode and the erasing mode.

Among the reproduced RF signals read from the recordable disk 1 by the optical head 12, reproduced signals from the prerecorded area 4 are supplied to a decoder 16 through the prerecorded signal reproduction amplifier 14, and the absolute address data decoded by the decoder 16 are supplied to a microcomputer 17. Also, reproducing signals reproduced from a data recorded area 5 of the recordable disk 1 are supplied to a reproduced signal processing circuit 18 through the opto-magnetic signal reproduction amplifier 15 to be treated with the prescribed signal processing. The musical information reproduced from a program area 6 of the recordable type disk 1 is supplied from the reproduced signal processing circuit 18 to a digital to analog (D/A) converter 20, where it is converted into analog signals to be outputted from a signal output terminal 22 through a buffer amplifier 21 as reproduced audio signals $S_o$. The TOC information reproduced from the lead-in section 7 of the recordable type disk 1 is supplied from the reproduced signal processing circuit 18 to a TOC buffer memory 19 to be stored therein.

In the disk recording/reproducing device, audio signals $S_1$ recorded in the program area 6 of the recordable disk 1 are supplied from a signal input terminal 23 through a buffer amplifier 24 to an analog to digital (A/D) converter 25 to be digitized therein. The musical information digitized by the A/D converter 25 is supplied to the optical head 12 through the recording amplifier 27 after being treated with the prescribed signal procession at a recorded signal processing circuit 26 so as in be recorded to the program area 6 of the recordable disk 1.

To the microcomputer 17 there are connected an operational key 28 for inputting control data, a display 29 for displaying various data, and a space buffer memory 30 where information indicating a recordable area in the program area 6 of the recordable disk 1 is stored. Outputs from the A/D converter are also supplied to the microcomputer 17 as detection signals of silent parts.

With this recordable disk 1, it is possible to record musical information of for example 60 minutes in the program area 6. For example, a first tune starts playing from 00'00" and ends at 05'00", a second tune starts from 08'00" and ends at 13'00", a third tune starts from 15'03" and ends at 20'00", a fourth tune starts from 28'00" and ends at 36'00", and a fifth tune starts from 36'20" and ends at 41',00" such that musical information including five tunes has been already recorded therein, as seen from FIG. 4. In the lead-in section 7, TOC information shown in Table 1 indicating the respective record areas of the musical information from said first to fifth tunes by absolute addresses is recorded as to indicate the recorded contents of the program area 6.

In addition, the respective already recorded areas are not always required to be indicated by the absolute address from a starting point of the program area but may be indicated in combination with relative addresses such as a start playing time and a playing time.

TABLE 1

| | contents of TOC information | |
|---|---|---|
| tune number | start playing time | end playing time |
| 1 | 00' 00" | 05' 00" |
| 2 | 08' 00" | 13' 00" |
| 3 | 15' 03" | 20' 00" |
| 4 | 28' 00" | 36' 00" |
| 5 | 36' 20" | 41' 00" |

Figure 5:
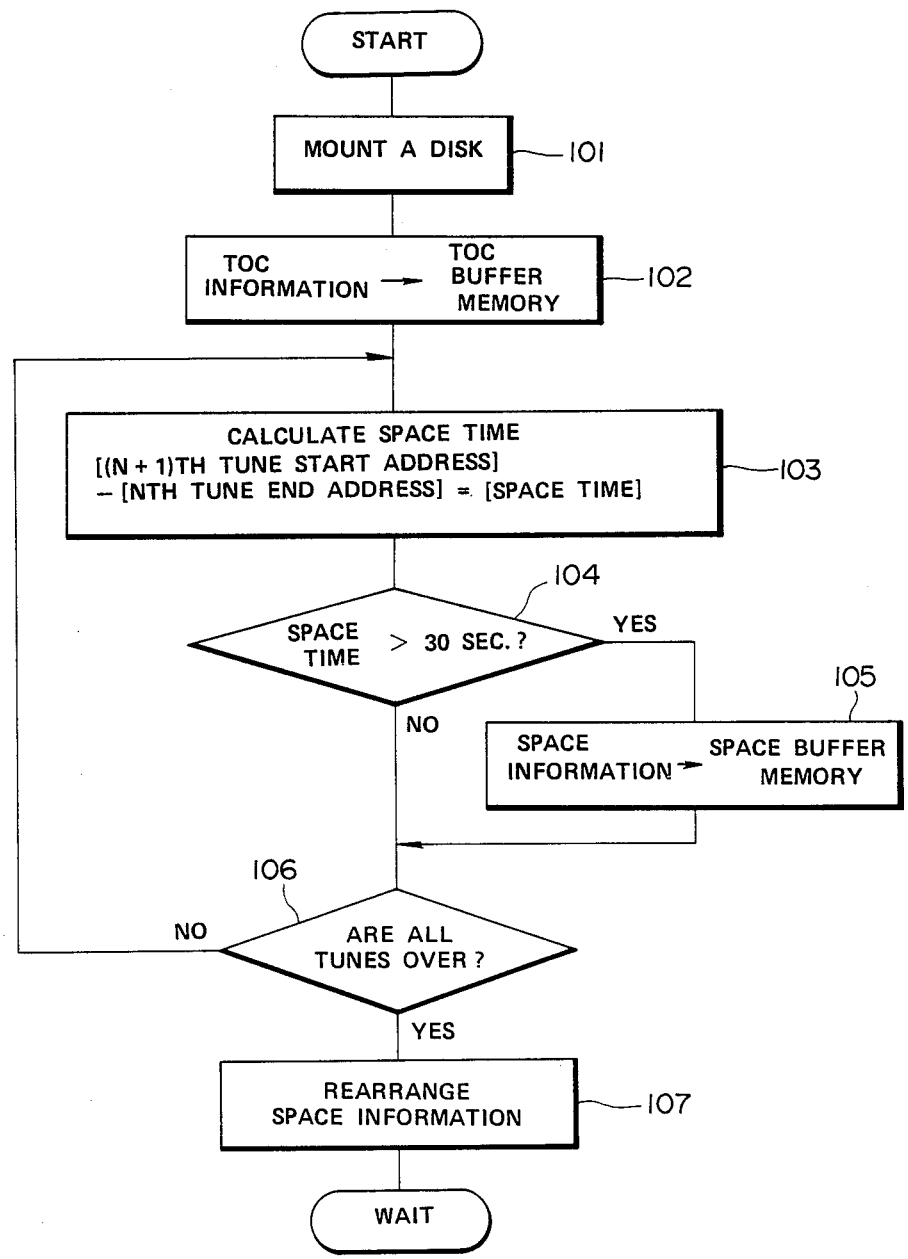
FIG. 5 is a flow chart showing a set-up mode of operation of said disk recording/reproducing device.

With reference to the flow chart of FIG. 5 where an operation at set-up mode is shown, when the recordable disk 1 is mounted at the time of start operating in step 101, the disk recording/reproducing device of the present embodiment at first reads out the TOC information recorded in the lead-in section 7 of the recordable disk 1 a the optical head 12 and reproduces it to be stored in the TOC buffer memory 19 in step 102. On the basis of the TOC information stored in the TOC buffer memory 19, an address difference of a start playing time of (N+1)th tune and an end playing time of (N)th tune which acts as a space time indicating a recordable area of the program area 6 of the recordable disk 1 is calculated in step 103. In step 104, there is a check to determine where said difference, namely, the space toime is longer or larger than the prescribed address difference of for example, 30 seconds. If the result of the check in step 104 is N=1, i.e., there is a difference of more than 30 seconds between the start playing time of said second tune and the end playing time of said first tune, it is determined in step 105 that the interval between these first and second tunes is a recordable area. At the same time, the recordable time indicated by the difference data of the starting playing time of the second tune (start address data) and the end playing time of the first tune (end address data) is stored in the space buffer memory 30 as space information together with space numbers and son on. When the operation in step 105 is over, or as the result of the check in 104 it is checked that the difference of miore than 30 seconds does not exist during the start playing time of the second tune and the end playing time of the first tune, control returns to step 103 through step 106 where there is a check to determine whether the detection of the recordable area in respect of the TOC information of all the tunes stored in the TOC buffer memory 19 is performed. In step 103, the difference between the start playing time of the third tune (start address data) and the end playing time of the second tune (end address data) is calculated and the space information is stored in the space buffer memory 30 through step 104 and 105. In such manner, the address difference detection with respect to all the tunes included is in turn executed so as to detect the recordable area having the recordable time of more than 30 seconds. If the result of the check in step 106 is YES, namely, the detecting procedure of the recordable area is over, the space information stored i the space buffer memory 30 are rearranged in order to form a short recordable time in step 107 so as to be a waiting state.

It is to be noted that during detection of the recordable area in the program area 6 of the recordable disk 1 by calculation on the basis of the TOC information shown in Table 1, there is substantially retained a 3-second time in reserve at the respective start and end of recording. Such space information as given in Table 2 is detected by the microcomputer 17 to be stored in the space buffer memory 30.

TABLE 2

| a chart showing space information | | |
|---|---|---|
| space number | start recording time | recordable time |
| 1 | 13' 03" | 01' 57" |
| 2 | 05' 03" | 02' 54" |
| 3 | 20' 03" | 07' 54" |
| 4 | 41' 03" | 18' 54" |

Figure 6:
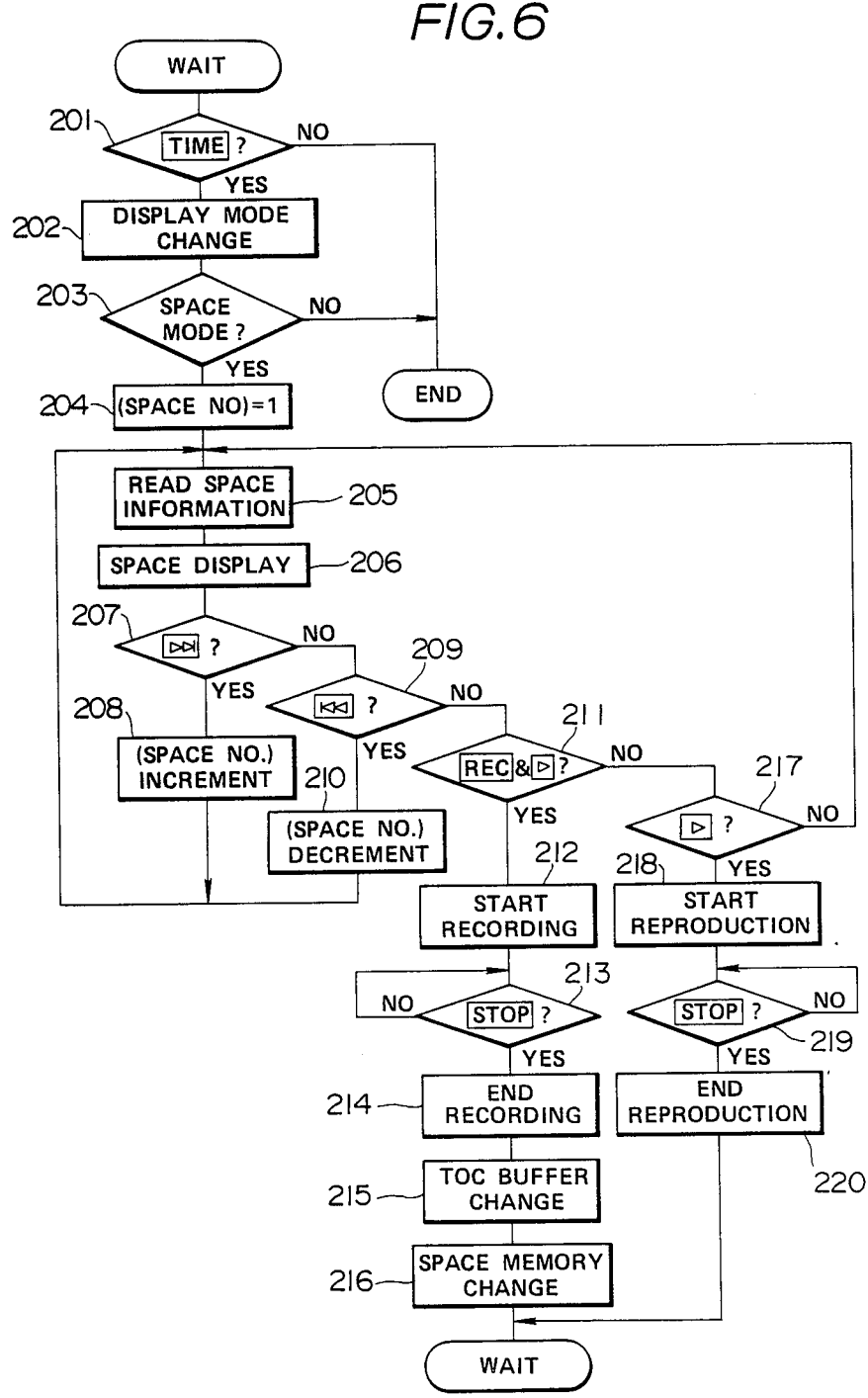
FIG. 6 is a flow chart showing a space mode of operation of the disk recording/reproducing device.
Figure 8:
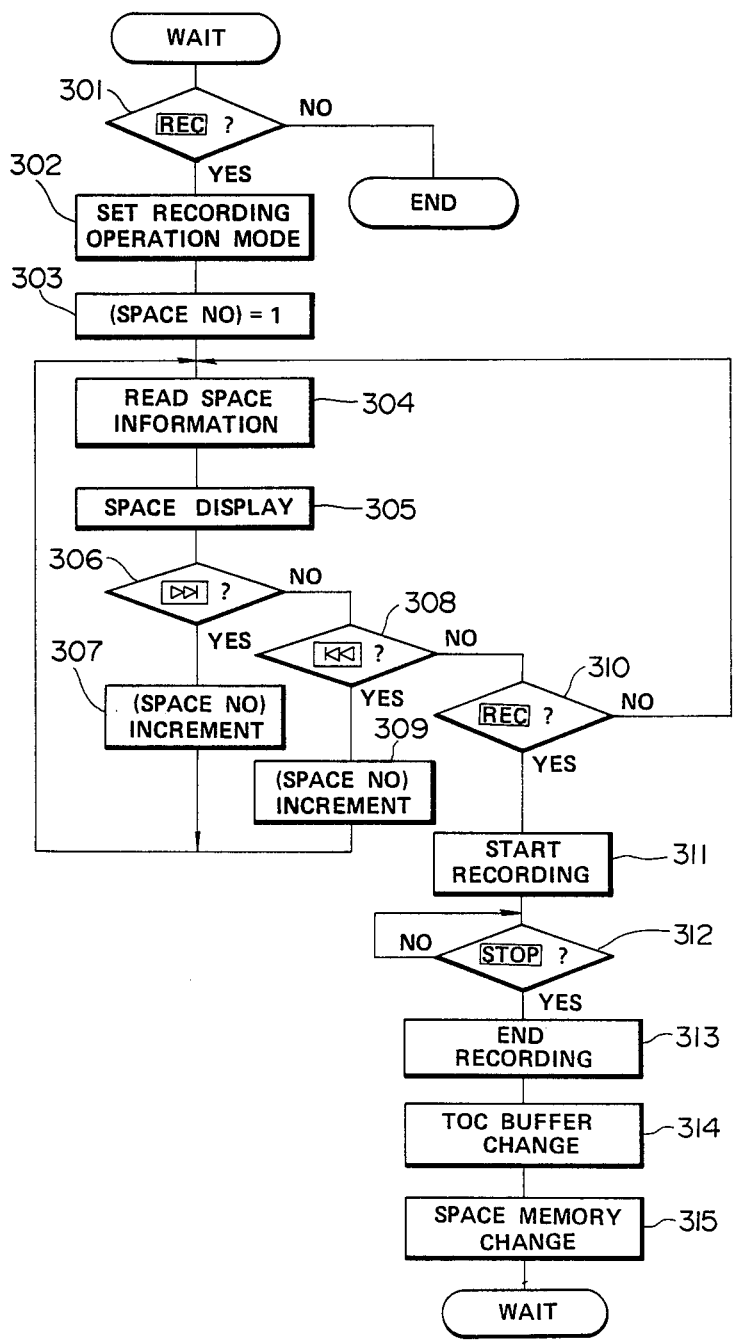
FIG. 8 is a flow chart showing a recording mode of operation of the disk recording/reproducing device.

The microcomputer 17 performs a space mode control operation and a recording mode control operation as shown by the flow charts of FIGS. 6 and 8, respectively, at the waiting state where the TOC information is stored in the TOC buffer memory 19 and the space information is stored in the space buffer memory 30 by accepting control inputs due to the operational key 28.

More particularly with reference to the flow chart of FIG. 6, when the microcomputer 17 accepts an operation of TIME key as the operational key 28 in stpe 201, the display mode of the display 29 is changed in step 202. Then there is a check to determine whether the operation mode to be set is a space mode or not in step 203. In case it is YES, space number (No.) is set to '1' in step 204 so as to read out the space information the space number (No.) of which is '1' from the space buffer memory 30 in step 205. The space display is indicated on a display screen of the display 29 in step 206.

Figure 7:
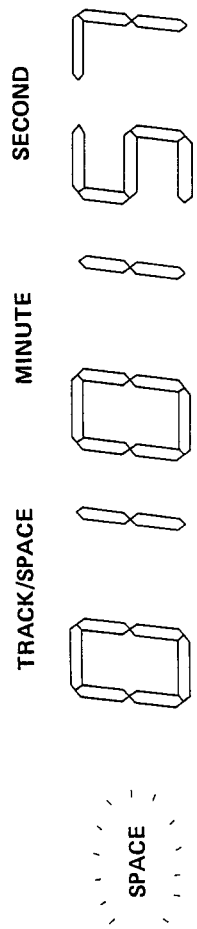
FIG. 7 schematically illustrates contents of a display in said space mode.

When the space mode is set, there is indicated on the display screen of the display 29 the word 'SPACE', and the particular space number (No.) together with its recordable time (minute, second) as seen from FIG. 7.

When the microcomputer 17 accepts an operation of FF key as the operational key 28 at the space mode in step 207, space number (No.) is incremented in step 208 and control returns to step 205 for space information reading operation to display the space information of the particular space number (No.) on the display screen of the display 29. WHen the microcomputer 17 accepts an operation of FR keys as the operational key 28 in step 209, space number (No.) is decremented in step 210 and control returns to step 205 for space information reading operation to display the space information of the particular space number (No.) on the display screen of the display 29.

Further, when the microcomputer 17 accepts a simultaneous operation of REC key and PLAY key as the operational key 28 at the space mode in step 211, recording operation in respect to the recordable area of the space number (No.) indicated on the display screen of the display 29 is started in step 212. The recording operation takes place until the microcomputer 17 accepts an operation of STOP key in step 213. When theoperation of STOP key is accepted in step 213, the recording operation is terminated in step 214, and the contents of the TOC buffer memory 19, namely, TOC information are changed instep 215. In addition, the contents of the space buffer memory 30, that is, space information are changed in step 216 to be a waiting state.

In case the musical information of 2'40" is recorded in the recordable area with space number (No.) '2' having the recordable time of 2'54", due to the procedure in step 215 and step 216, the contents of the TOC buffer memory 19 are changed to the new TOC information as indicated in Table 3.

TABLE 3

| contents of TOC information | | |
|---|---|---|
| tune number | start playing time | end playing time |
| 1 | 00' 00" | 05' 00" |
| 2 | 05' 03" | 07' 43" |
| 3 | 08' 00" | 13' 00" |
| 4 | 15' 03" | 20' 00" |
| 5 | 28' 00" | 36' 00" |
| 6 | 36' 20" | 41' 00" |

The contents of the space buffer memory 30 are changed to the new space information as shown in Table 4.

TABLE 4

| a chart showing new space information | | |
|---|---|---|
| tune number | start recording time | recordable time |
| 1 | 13' 03" | 01' 57" |
| 2 | 20' 03" | 07' 54" |
| 3 | 41' 03" | 18' 54" |

Also, when the microcomputer 17 accepts a single operation of PLAY key as the operational key 28 at the space mode in step 217, reproducing operation with respect to the recordable area of a space number (No.) indicated on the display screen of the display 29 is started in step 219. The reproducing operation takes place until an operation of STOP key is accepted in step 220. When the microcomputer accepts the operation of STOP key in step 219, the reproducing operation is terminated in step 220 to be a waiting state. According to this reproducing operation, recorded contents of the remained recordable area after the superposed recording can be confirmed.

As seen from the flow chart of FIG. 8, when the microcomputer 17 accepts an operation of REC key as the operational key 28 in step 301, the recording operation mode is set in step 302. Then, a space number (No.) is set to '1' in step 303 such that the space information the space number (No.) of which is '1' is read out in step 304 to be indicated on the display screen of the display 29 in step 305.

When the recording operation mode is set on the display screen of the display 29, the word 'SPACE' together with the particular space number (No.) and its recordable time (minute, second) is indicated thereon as in the abovementioned space mode.

When the microcomputer 17 accepts an operation of FF key as the operational key 28 at the setting state of recording operation mode in step 306, space number (No.) is incremented in step 307 and control returns to step 204 for space information reading operation, where the space information of the space number (No.) is indicated on the display screen of the display 29. Or when the microcomputer 17 accepts an operation of FR key as the operational key 28 in step 308, a space number (No.) is decremented in step 308 and control returns to step 305 for space information reading operation, where the space information of the space number (No.) is indicated on the display screen of the display 29.

In addition when the microcomputer again accepts the operation of REC key as the operational key 28 at the setting state of the recording operation mode in step 310, recording operation with respect to the recordable area of the space number (No.) indicated on the display screen of the display 29 is started in step 311. The recording operation takes place until the operation of STOP key is accepted in step 312. When the microcomputer 17 accepts the operation of STOP key, the recording operation is terminated in step 313 and the contents of the TOC buffer memory 19, that is, TOC information, are changed in step 314. Besides, the contents of the space buffer memory 30, namely, the space information, are changed in step 315 to be the state of waiting.

For example, in case the musical information of 1'45" is recorded in the recordable area with a space number (No.) '1' including recordable time of 1'57", The contents of the TOC buffer memory 19 are changed to the new TOC information as shown in Table 5 in accordance with procedures taken in step 314 and step 315.

TABLE 5

| tune number | control of TOC information | |
|---|---|---|
| | start recording time | end recording time |
| 1 | 00' 00" | 05' 00" |
| 2 | 05' 03" | 07' 43" |
| 3 | 08' 00" | 13' 00" |
| 4 | 13' 03" | 14' 48" |
| 5 | 15' 03" | 20' 00" |
| 6 | 28' 00" | 36' 00" |

TABLE 5-continued

| tune number | control of TOC information | |
|---|---|---|
| | start recording time | end recording time |
| 7 | 36' 20" | 41' 00" |

The contents of the space buffer memory 30 are change to the new space information as indicated in Table 6.

TABLE 6

| space number | showing the new space information | |
|---|---|---|
| | start recording time | recordable time |
| 1 | 20' 03" | 07' 54" |
| 2 | 41' 03" | 18' 54" |

As stated above, the disk recording/reproducing device of the present invention embodiment performs successive reproduction of each tune in the spontaneous order to be selectively designated by the microcomputer 17 on the basis of the TOC information recorded in the TOC buffer memory 19 by operating the operational key 28 during reproduction of each musical information recorded in the program area 6 of the recordable disk 1.

Figure 9:
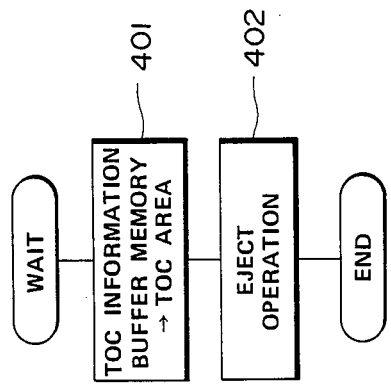
FIG. 9 is a flow chart showing an ejecting mode of operation of the disk recording/reproducing device.

Further, with reference to the flow chart of FIG. 9, when an ejecting mode is designated by an operation of the operational key 28, the TOC information stored in the TOC buffer memory 19 is recorded in the lead-in section 7 of the recordable disk 1 at the optical head 12 in step 401. Soon after this procedure the microcomputer 17 performs ejecting operation in step 402 so as to terminate the control operation.

Although the present invention has been shown and described with respect to a preferred embodiment, various changes and modifications which are obvious to a person skilled in the art to which the invention pertains are deemed to lie within the spirit and scope of the invention.

What is claimed is:

1. A disk recording device for recording data such as musical information on a recordable disk, said disk having a program area, absolute addresses recorded in said program area, a circumferential area, and a lead-in section in said circumferential area, and said device comprising:

recording means for first recording blocks of said data in said program area and thereafter recording in said lead-in section address data indicating respective addresses of said blocks; and data processing means for reading said address data, obtaining respective start and end addresses of said blocks on the basis of said address data, comparing the end address of respective ones of said blocks with the start address of respective next succeeding ones of said blocks to obtain respective address differences, and identifying respective recordable areas corresponding to said respective address differences in each case where one of said address differences exceeds a predetermined threshold.

2. A disk recording device according to claim 1 wherein said data processing means comprises display means for displaying said address differences.

3. A disk recording device according to claim 1 wherein said threshold is substantially 30 seconds.

4. A disk recording device according to claim 1 wherein said data processing means comprises storage means wherein said address differences are written.

5. A disk recording device according to claim 4 wherein said data processing means comprises display means for sequentially reading and displaying said address differences.

6. A disk recording device according to claim 4 wherein said data processing means comprises recording control means for setting a recording waiting mode in response to a first user command and starting a recording operation in response to a second user command and display means for sequentially reading out and displaying said address differences in said recording waiting mode.

7. A disk recording device according to claim 5 wherein said data processing means comprises recording control means for recording data in a recordable area identified by a selected one of said address differences.

8. A disk recording device according to claim 5 or claim 6 wherein said address differences are displayed in order of magnitude.

9. A disk recording device according to claim 8 wherein said order of magnitude proceeds form smaller to larger.

10. A disk recording device according to claim 8 wherein said address differences are displayed together with a space number identifying said respective recordable areas.

11. A disk recording device according to claim 8 wherein said display means is capable of operation in a plurality of modes wherein respectively different information is displayed and further comprising a plurality of operational keys for sequentially changing said modes.

12. A disk recording device for recording data such as musical information on a recordable disk, said disk having a program area, absolute addresses prerecorded in said program area, a circumferential area, and a lead-in section in said circumferential area, and said device comprising:

recording means for first recording blocks of said data in said program area and thereafter recording in said lead-in section start address data and end address data of respective ones of said blocks; and data processing means for reading said start address data and end address data, comparing the end address of respective ones of said blocks with the start address of respective next succeeding ones of said blocks on the basis of the address data to obtain respective address differences, and identifying respective recordable areas corresponding to said respective address differences in each case where one of said address differences exceeds a predetermined threshold.

13. A disk recording device according to claim 12 wherein said data processing means comprises display means for displaying said address differences.

14. A disk recording device according to claim 1 wherein said program area is annular and has an inner side and an outer side and said circumferential area borders said inner side.

15. A disk recording device according to claim 1 wherein said program area is annular and has an inner side and an outer side and said circumferential area borders said outer side.

* * * * *